United States Patent
Geppert

(10) Patent No.: US 9,575,471 B2
(45) Date of Patent: Feb. 21, 2017

(54) FIELD DEVICE FOR PROCESS INSTRUMENTATION

(71) Applicant: Siemens Aktiengesellschaft, Munich (DE)

(72) Inventor: Michael Geppert, Ottersweier (DE)

(73) Assignee: Siemens Aktiengesellschaft, Munich (DE)

( * ) Notice: Subject to any disclaimer, the term of this patent is extended or adjusted under 35 U.S.C. 154(b) by 113 days.

(21) Appl. No.: 14/340,877

(22) Filed: Jul. 25, 2014

(65) Prior Publication Data

US 2015/0035684 A1    Feb. 5, 2015

(30) Foreign Application Priority Data

Aug. 1, 2013    (DE) .................. 10 2013 215 077

(51) Int. Cl.
*G05B 9/02* (2006.01)
*G08C 19/00* (2006.01)
*G05B 19/042* (2006.01)
*H04Q 9/00* (2006.01)

(52) U.S. Cl.
CPC ............ *G05B 9/02* (2013.01); *G05B 19/0423* (2013.01); *G08C 19/00* (2013.01); *H04Q 9/00* (2013.01); *G05B 2219/24028* (2013.01); *G05B 2219/25428* (2013.01)

(58) Field of Classification Search
CPC ............... G05B 19/0423; G05B 9/02; G05B 2219/25428; G05B 2219/24028
See application file for complete search history.

(56) References Cited

U.S. PATENT DOCUMENTS

| 3,955,132 A | * | 5/1976 | Greenwood | ........... H02H 9/008 323/231 |
| 4,412,265 A | * | 10/1983 | Buuck | ................... H02H 9/008 361/18 |
| 4,751,614 A | | 6/1988 | Mehnert | |
| 4,807,149 A | * | 2/1989 | Mehnert | ................. H01B 7/08 340/2.4 |

(Continued)

FOREIGN PATENT DOCUMENTS

| CN | 101226375 | 7/2008 |
| CN | 201444570 | 4/2010 |

(Continued)

*Primary Examiner* — Hai Phan
*Assistant Examiner* — Son M Tang
(74) *Attorney, Agent, or Firm* — Cozen O'Connor

(57) ABSTRACT

A field device for process instrumentation comprises a measuring and comparison device and a readable storage element. The measuring and comparison device is configured for monitoring an operating characteristic variable for compliance with a predefined range. The readable storage element maintains a state. The storage element state is permanently changed if a value held by the operating characteristic variable goes out of said predefined range. The predefined range is determined in such a manner that, as a result of a changed state of the storage element, a loss of suitability of the field device for special operation with an operating characteristic variable with restricted specifications, but not a loss of suitability for normal operation with an operating characteristic variable with less restricted specifications, is indicated.

5 Claims, 1 Drawing Sheet

(56) References Cited

U.S. PATENT DOCUMENTS

| | | | | |
|---|---|---|---|---|
| 4,979,067 A * | 12/1990 | Foley | | G05F 1/569 |
| | | | | 361/18 |
| 5,835,534 A * | 11/1998 | Kogure | | H02H 9/008 |
| | | | | 340/12.32 |
| 6,366,436 B1 * | 4/2002 | Maier | | G01F 15/06 |
| | | | | 361/93.9 |
| 6,397,322 B1 * | 5/2002 | Voss | | H02H 9/008 |
| | | | | 340/532 |
| 6,865,509 B1 * | 3/2005 | Hsiung | | G05B 15/02 |
| | | | | 700/95 |
| 7,075,765 B2 * | 7/2006 | Frey | | H02H 9/008 |
| | | | | 361/93.1 |
| 7,663,350 B2 * | 2/2010 | Kirst | | H02H 9/008 |
| | | | | 323/268 |
| 7,742,270 B2 * | 6/2010 | Otto | | H02H 9/008 |
| | | | | 361/103 |
| 7,791,228 B2 * | 9/2010 | Schaefer | | H02H 9/008 |
| | | | | 257/683 |
| 7,844,410 B2 * | 11/2010 | Lalla | | G01F 1/8409 |
| | | | | 323/209 |
| 2003/0153988 A1 * | 8/2003 | Shepard | | G05B 19/042 |
| | | | | 700/19 |
| 2003/0204337 A1 * | 10/2003 | Beutelschiess | | B60L 3/0023 |
| | | | | 702/51 |
| 2003/0204373 A1 * | 10/2003 | Zielinski | | G05B 9/02 |
| | | | | 702/184 |
| 2005/0075817 A1 * | 4/2005 | Kah | | F16K 31/1262 |
| | | | | 702/108 |
| 2007/0241866 A1 * | 10/2007 | Cool | | G08B 25/009 |
| | | | | 340/10.41 |
| 2008/0012428 A1 * | 1/2008 | Lalla | | G01D 21/00 |
| | | | | 307/97 |
| 2010/0013325 A1 * | 1/2010 | Vande Vusse | | G05B 19/0423 |
| | | | | 307/130 |
| 2010/0164528 A1 * | 7/2010 | Rahman | | G01R 35/005 |
| | | | | 324/762.01 |
| 2012/0038458 A1 * | 2/2012 | Toepke | | G05B 19/042 |
| | | | | 340/6.1 |
| 2012/0078391 A1 * | 3/2012 | Zornio | | G05B 23/0272 |
| | | | | 700/80 |
| 2012/0236769 A1 * | 9/2012 | Powell | | G05B 19/0426 |
| | | | | 370/310 |
| 2013/0120155 A1 * | 5/2013 | Hagg | | G01F 23/00 |
| | | | | 340/870.01 |
| 2013/0179697 A1 * | 7/2013 | Nicholas | | G06F 1/30 |
| | | | | 713/300 |
| 2014/0151587 A1 * | 6/2014 | LaFountain | | G05B 19/042 |
| | | | | 251/129.01 |

FOREIGN PATENT DOCUMENTS

DE 102007049525 A1 4/2009
WO WO 0161362 A1 8/2001

* cited by examiner

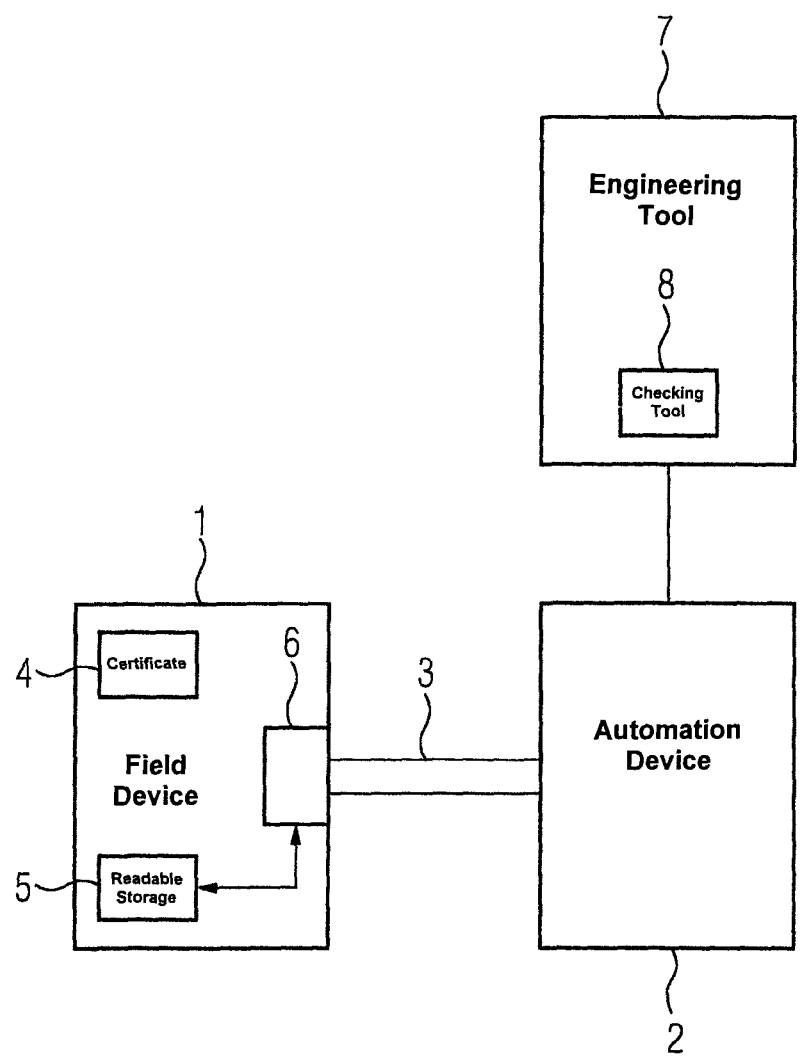

FIELD DEVICE FOR PROCESS INSTRUMENTATION

FIELD OF INVENTION

The invention relates to a field device for process instrumentation, in which an operating characteristic variable is monitored for compliance with a predefined range and the state of a readable storage element is permanently changed if the range is left, in order to record the event which has occurred.

DESCRIPTION OF THE RELATED ART

A field device for process instrumentation is already known from International Patent Application Publication No. WO 01/61362 A1. Versatile field devices for process instrumentation are used to control processes in process installations. Measuring transducers are used to record, process variables, such as temperature, pressure, flow rate, filling level, density and gas concentration of a medium. The process sequence can be influenced by actuators, on the basis of recorded process variables, corresponding to a strategy which is predefined by a superordinate controller, such as a programmable logic controller or a control station. A control valve, a heater or a pump may be mentioned as examples of actuators.

For the purpose of communication, field devices and superordinate controllers are connected to one another in an automation network. In field devices with highway addressable remote transducer (HART) communication in the automation network for example, the field devices are supplied with the energy needed for their operation by applying a supply voltage to the same two-wire line which is also used to transmit data.

If field devices are used in areas subject to explosion hazards where combustible substances and oxygen, for example, form an explosive mixture, particular explosion protection measures must be taken for the safety of persons and for a safe, disturbance-free production process. One measure is to avoid ignition sources by using field devices in intrinsically safe circuits.

A circuit is referred to as intrinsically safe if the current and voltage are limited to such an extent that a spark or thermal effect cannot trigger ignition of an explosive atmosphere. In order to keep the energy of the spark below the minimum required ignition energy of the surrounding gas, the voltage is limited, on, the one hand. The thermal effect, that is to say excessively hot surfaces, is prevented by means of current limitation, on the other hand. This also applies to the field devices connected to the intrinsically safe circuits.

Depending on the respective application, the operator of the installation stipulates the certificates which relate to the respectively required explosion protection and must be complied with by the field devices provided for use in the area subject to explosion hazards.

When planning the installation, only field devices which meet the respective explosion protection requirements on the basis of their certification are therefore used. In this case, a situation can disadvantageously occur in which a field device with sufficient certification was operated in an earlier application in such a manner that it has lost the permission for the desired use in the meantime. For example, in the known SITRANS P500 pressure transducer with HART communication, which is sold by Siemens AG, a loss of the safety of the device with intrinsic safety ignition protection category "Ex i" occurs if the device has already been operated in circuits which are not intrinsically safe, or if the information relating to the operating characteristic variables, which have restricted specifications for "special" operation in areas subject to explosion hazards, has not been heeded.

During "normal" operation outside areas subject to explosion hazards, a terminal voltage across the measuring transducer of 10.6 V to 44 V is allowed. In contrast, during use in areas subject to explosion hazards, the terminal voltage as the operating characteristic variable is specified as being restricted to a range of 10.6 V to 30 V. The field device is not allowed to be used in areas subject to explosion hazards if the terminal voltage in an earlier application was once greater than 30 V and a loss of the safety of the device with intrinsic safety ignition protection category "Ex i" has therefore occurred. Although the safety appears to be present according to the allocated certificates, this can therefore be restricted owing to the earlier method of operation of the field device.

SUMMARY OF THE INVENTION

The invention is based on an object of providing a field device for process instrumentation that can make it possible to comply with safety rules in a more reliable manner.

The invention encompasses novel field devices as well as methods for operating a field device for process instrumentation and a computer program and a computer program product for carrying out the method.

If field devices are used in safety-relevant areas, for example areas subject to explosion hazards, there may be restricted specifications for certain operating characteristic variables, such as the terminal voltage applied to supply inputs. Whereas a range of permissible values of the operating characteristic variable, which is greater than the restricted specification for the safety-relevant area, is predefined for normal operation of the field device (i.e., for operation outside the safety-relevant area in question), the restricted specification must be complied with in the safety-relevant area. If the operating characteristic variable leaves the predefined range of the restricted specification during normal operation, this can result, as explained above using the example of the terminal voltage as the operating characteristic variable, in immediate and permanent loss of suitability of the field device for special operation, such as for use of the field device in an area subject to explosion hazards. This loss is now advantageously indicated by a readable storage element, the state of which permanently changes if the event occurs.

The readable storage element may be implemented, for example, using a special bit of a status byte used in the field device, which is used to indicate the field device state. The permanent state change of the storage element means that the operator of a process installation can always discern that special operation of the field device is no longer allowed, that is to say that the field device can no longer be used in areas subject to explosion hazards, for example. The risk of impermissible use in safety-relevant areas is therefore reduced and the safety during use of field devices in areas subject to explosion hazards is further improved.

The operator can be informed of the state of the field device, for example, using a display on a control panel of the field device in situ or using output on a remote control station which is connected to the field device via an automation network.

An embodiment of the invention in which the operating characteristic variable is the terminal voltage of the supply feed line on the field device, which has restricted specifications for special operation of the field device in explosion-proof areas, is particularly advantageous. If the restricted specification is exceeded, the loss of safety of the field device with intrinsic safety ignition protection category "Ex i" occurs and the readable storage element advantageously makes it possible to automatically test the safety before the field device is operated in an area subject to explosion hazards.

Since a residual risk of the occurrence of faults cannot be completely excluded, faults can also occur during special operation of the field device, i.e., only after the safety has been checked using the device certificates and the device status byte, which is preferably carried out by an installation operator before the field device is started up in a safety-relevant area. An alarm message, which is immediately generated by the field device when a fault occurs during its operation in an area subject to explosion hazards, enables a rapid response with suitable fault handling measures, and safety risks can be reduced further.

A method for operating a field device, in which a readable storage element permanently changes its state if a characteristic variable leaves a range with restricted specifications, is preferably implemented using software or a combination of software/hardware, with the result that the invention also relates to a computer program having program code instructions which can be executed by a computer for the purpose of implementing the described method. In this context, the invention also relates to a computer program, product, in particular a data storage medium or storage medium, having such a computer program which can be executed by a computer. Such a computer program is preferably part of electronics of the field device or is held in a memory of the field device electronics or can be loaded into said memory, with the result that the state of the readable storage element is automatically changed, if necessary, during operation of the field device.

BRIEF DESCRIPTION OF THE DRAWINGS

The invention as well as refinements and advantages are explained in more detail below using the drawing which illustrates an exemplary embodiment of the invention.

The single FIGURE shows a block diagram of a simple process installation in accordance with one embodiment of the present invention.

DETAILED DESCRIPTION OF THE PRESENTLY PREFERRED EMBODIMENTS

The block diagram in the single FIGURE shows a simple process installation comprising a field device 1 and an automation device 2 which are connected to one another via an automation network 3. In the embodiment shown, a field device 1 with highway addressable remote transducer (HART) communication which is connected to the automation device 2 using a two-wire line is involved.

The field device 1 has a memory with electronically readable description data, which stores, among other things, a certificate 4 which indicates its approval for use in areas subject to explosion hazards. A readable storage element 5 which is implemented as a special bit in a status byte is additionally provided in the field device 1.

During normal operation, that is to say outside areas subject to explosion hazards, a terminal voltage of between 10.6 V and 44 V is permissible on the network connection with which the field device is connected to the automation network 3. In contrast, during special operation, that is to say during operation in areas subject to explosion hazards, the terminal voltage must not leave a range of between 10.6 V and 30 V.

In addition, a field device which had once been operated with a terminal voltage of greater than 30 V can subsequently no longer be used in areas subject to explosion hazards for reasons of explosion, protection. The operating characteristic variable of the terminal voltage is monitored in the field device 1 for compliance with the restricted specification by monitoring means 6, for example using a measuring and comparison device, and the state of the readable storage element 5 is permanently changed as soon as the event occurs in which the terminal voltage exceeds the value of 30 V, whether during normal operation of the field device 1 or during special operation in safety-relevant areas.

The range, for the compliance with which the terminal voltage is monitored, is therefore predefined in such a manner that, as a result of a changed state of the storage element, a loss of suitability of the field device 1 for special operation with a terminal voltage with restricted specifications as the operating characteristic variable is indicated, but the field device is still suitable for normal operation outside explosion-proof areas.

When planning and starting up the installation, an engineering tool 7 is connected to the automation device 2 which may be in the form of a programmable logic controller. During planning, attention has previously only been paid to the fact that the field devices used in the installation, here the field device 1, have been suitably certified for the respective application. The certificate 4, for example, is used for an automatic test with the aid of a checking tool 8.

It is now additionally checked whether the suitability of a field device for special operation, which is determined by the respective application, has been canceled owing to an earlier method of operation of said field device. If such a loss has occurred, this is indicated by the changed state of the storage element 5. This check is likewise carried out in an automated manner by the checking tool 8 with the aid of communication via the automation network 3. The checking tool 8 can alternatively be downloaded onto the automation device 2 and can run there as a program during start-up.

If the terminal voltage, as the operating characteristic variable with restricted specifications, leaves the predefined range during special operation, that is to say after start-up, the event is likewise detected by the monitoring means 6 and the state of the readable storage element 5 is permanently changed. At the same time, an alarm message for indicating the fault is output to the automation device 2, as the superordinate controller, via the automation network 3 so that suitable fault handling measures can be initiated. Depending on the safety relevance, a suitable measure is, for example, stopping of the respectively controlled production process in order to avoid unnecessarily endangering persons and devices.

Although the present invention has been described above with reference to presently preferred embodiments, it is not limited thereto but rather can be modified in a wide variety of ways. In particular, the invention can be altered or modified in multifarious ways without departing from the essence of the invention.

What is claimed is:
1. A field device for process instrumentation, comprising:
a measuring and comparison device configured to monitor an operating characteristic variable for compliance with a predefined range; and a readable storage element having a state which is permanently changed when a value held by said operating characteristic variable leaves said predefined range;

wherein said predefined range is determined such that, as a result of a changed state of said storage element, a loss of suitability of the field device for special operation with an operating characteristic variable with restricted specifications, but not a loss of suitability for normal operation with an operating characteristic variable with less restricted specifications, is indicated.

2. The field device of claim 1, wherein said operating characteristic variable is a supply voltage of the field device, and wherein said loss of suitability of the field device is given by the loss of safety of the field device with intrinsic safety ignition protection category.

3. The field device of claim 1, wherein an alarm message is generated if said state of the storage element changes during operation of the field device in an area subject to explosion hazards.

4. A method for operating a field device for process instrumentation, comprising:

monitoring an operating characteristic variable for compliance with a predefined range; and changing a state of a readable storage element permanently when a value held in said operating characteristic variable leaves said predefined range;

wherein said predefined range is determined such that, as a result of a changed state of said storage element, a loss of suitability of the field device for special operation with an operating characteristic variable with restricted specifications, but not a loss of suitability for normal operation with an operating characteristic variable with less restricted specifications, is indicated.

5. A non-transitory computer program product encoded with a computer program executed by a computer which causes operation of a field device for process instrumentation, the computer program comprising:

program code for monitoring an operating characteristic variable for compliance with a predefined range; and program code for changing a state of a readable storage element permanently when a value held in said operating characteristic variable leaves said predefined range;

wherein said predefined range is determined such that, as a result of a changed state of said storage element, a loss of suitability of the field device for special operation with an operating characteristic variable with restricted specifications, but not a loss of suitability for normal operation with an operating characteristic variable with less restricted specifications, is indicated.

* * * * *